United States Patent
Chen et al.

(10) Patent No.: US 10,243,341 B2
(45) Date of Patent: Mar. 26, 2019

(54) LED MODULE SEALING TECHNOLOGY

(71) Applicant: Hangzhou HPWinner Opto Corporation, Hangzhou, Zhejiang (CN)

(72) Inventors: Kai Chen, Zhejiang (CN); Jianming Huang, Zhejiang (CN); Huali Lu, Zhejiang (CN)

(73) Assignee: HANGZHOU HPWINNER OPTO CORPORATION, Zhejiang (CN)

( * ) Notice: Subject to any disclaimer, the term of this patent is extended or adjusted under 35 U.S.C. 154(b) by 0 days.

(21) Appl. No.: 15/695,709

(22) Filed: Sep. 5, 2017

(65) Prior Publication Data

US 2017/0373483 A1    Dec. 28, 2017

Related U.S. Application Data

(63) Continuation-in-part of application No. 14/403,108, filed as application No. PCT/CN2013/076937 on Jun. 7, 2013, now Pat. No. 9,788,444.

(30) Foreign Application Priority Data

Jun. 8, 2012  (CN) .......................... 2012 1 0188159
May 21, 2013  (CN) .......................... 2013 1 0189101
May 21, 2013  (CN) ..................... 2013 2 0278363 U

(51) Int. Cl.
*H01R 4/56*    (2006.01)
*H02G 3/22*    (2006.01)
(Continued)

(52) U.S. Cl.
CPC ........... *H02G 15/013* (2013.01); *F21V 27/02* (2013.01); *F21V 31/005* (2013.01); *H01R 4/56* (2013.01);
(Continued)

(58) Field of Classification Search
CPC .... F21V 27/02; F21V 31/105; F21Y 2115/10; H02G 15/013; H01R 13/5205; H01R 4/56
See application file for complete search history.

(56) References Cited

U.S. PATENT DOCUMENTS 6,309,257 B1 *  10/2001  Huang .................. H05K 5/061
                                                    174/50.5
2005/0018435 A1 *  1/2005  Selkee ..................... F21L 4/02
                                                    362/427
(Continued)

FOREIGN PATENT DOCUMENTS

CN    101769457 A    7/2010
CN    101893221 A *  11/2010
(Continued)

*Primary Examiner* — Timothy J Thompson
*Assistant Examiner* — Rhadames Alonzo Miller
(74) *Attorney, Agent, or Firm* — Muncy, Geissler, Olds & Lowe, P.C.

(57) ABSTRACT

A sealing process of LED modules, comprising: (1) a waterproof wire goes through a wire-through hole of a heat sink to be connected with a positive-negative solder joints on a PCB board, wherein the positive-negative solder joint and the position that the waterproof wire going through are subjected to glue sealing treatment, and a waterproof sealing process is operated between the waterproof wire and the wire-through hole; (2) fix the PCB board on the heat sink; (3) place one sealing ring into one of the grooves; (4) apply evenly a ring of liquid silica gel along the other groove of the lens set and the amount of the liquid silica gel is limited to completely sticking the solid silica gel sealing ring; (5) the heat sink installed with the PCB board and the waterproof wire as processed in step (2) is inversely buckled on the lens set which is set with the solid silica gel ring and the liquid silica gel as processed in step (4), so as to fix the heat sink entirety and the lens set. At least two waterproof sealing rings are used for completely isolating an LED chip from the (Continued)

outside so as to prevent all water vapor or other harmful gases from corroding the chip and the PCB, and the sealing rings are firmer when being compared with thin film sealing; the service life is longer and the guarantees to the sealing performance between the lens set and the heat radiation frame are realized.

2 Claims, 13 Drawing Sheets

(51) Int. Cl.

| | |
|---|---|
| *F21V 27/02* | (2006.01) |
| *F21V 31/00* | (2006.01) |
| *H01R 12/53* | (2011.01) |
| *H01R 13/52* | (2006.01) |
| *H01R 13/58* | (2006.01) |
| *F21Y 115/10* | (2016.01) |
| *H02G 15/013* | (2006.01) |

(52) U.S. Cl.
CPC ......... *H01R 12/53* (2013.01); *H01R 13/5205* (2013.01); *H01R 13/5804* (2013.01); *H02G 3/22* (2013.01); *F21Y 2115/10* (2016.08)

(56) References Cited

U.S. PATENT DOCUMENTS

2013/0330605 A1\* 12/2013 Kroll .................. C03C 3/19
  29/623.1
2014/0099533 A1\* 4/2014 Hartl .................. C03C 8/24
  429/175

FOREIGN PATENT DOCUMENTS

| CN | 101893221 | A | | 11/2010 |
| CN | 202118617 | U | \* | 1/2012 |
| CN | 202118617 | U | | 1/2012 |
| KR | 10-0657590 | B1 | | 12/2006 |

\* cited by examiner

LED MODULE SEALING TECHNOLOGY

CROSS-REFERENCE TO RELATED APPLICATIONS

This application is a Continuation-in-Part of co-pending application Ser. No. 14/403,108 filed on Nov. 21, 2014, which is a U.S. National Stage of International Application No. PCT/CN2013/076937 filed on Jun. 7, 2013, for which priority is claimed under 35 U.S.C. § 120; and this application claims priority of Application Nos. 201210188159.1 filed in China on Jun. 8, 2012, 201320278363.2 filed in China on May 21, 2013, and 201310189101.3 filed in China on May 21, 2013 under 35 U.S.C. § 119; the entire contents of all of which are hereby incorporated by reference.

TECHNICAL FIELD

The present invention relates to LED lighting device, especially to a sealing process for an LED module.

BACKGROUND ART

In the trend that energy conservation and environmental protection are promoted, LED has been applied more and more widely due to its feature of energy conservation and environmental protection, long service life, fast start-up, good safety and stability. At present, lighting devices of other sources have been gradually replaced by LED lighting device.

LED products may break down during its usage due to the penetration of moisture or other harmful gases into the base plate or metal oxidation. When the products are used for outdoor lighting, the sealing and waterproof performance should be especially taken into consideration.

Traditional LED products, with the waterproof structure of box-packaged and screws-tightened, are usually heavy and thick, which have great influence to the heat dissipation performance. In the patent application 200910054820.8, a waterproof sealing structure and its preparation process of LED module are disclosed, and the waterproof sealing structure includes LED element, base plat, electrode, and circuit board. The LED module is comprehensively covered with a layer of thin film PARYLENE of which the thickness is 3~25 MM. The film is even, tight, transparent, without any voids, and completely fit, to protect the LED module from intrusion of water, damp and air, and also facilitating heat dissipation of LED element. The thin film PARYLENE is one of the PARYLENE N, PARYLENE C, PARYLENE D or PARYLENE VT4.

In the above patent application, coverage of parylene thin film on the entire LED module is applied to realize sealing and waterproofing. The disadvantages of it include that the film can be easily scratched and damaged, rendering short service life. Meanwhile, complete coverage of thin film on the entire lamp means harder craft and higher cost.

SUMMARY OF THE INVENTION

The present invention provides a sealing process for an LED module, to resolve the technical problems of high cost of sealing and poor effect.

A sealing process for an LED module, comprising:

(1) a waterproof wire goes through a wire-through hole of a heat sink to be connected to a positive-negative solder joints on a PCB board, wherein the positive-negative solder joints and the position that the waterproof wire going through are subjected to glue sealing treatment, and a waterproof sealing process is operated between the waterproof wire and the wire-through hole;

(2) fix the PCB board on the heat sink;

(3) fix a lens set with at least two grooves of inner and external side into a stationary fixture of a glue machine, and place one sealing ring into one of the grooves;

(4) apply liquid silica gel along the periphery of the other groove of the lens set, and the amount of the silica gel is limited to completely sticking the solid silica gel sealing ring;

(5) the heat sink installed with the PCB board and the waterproof wire(s) as processed in step (2) is inversely buckled on the lens set which is set with the solid silica gel ring and the liquid silica gel as processed in step (4), so as to fix the heat sink entirety and the lens set;

(6) make the assembled LED module stand still so that the liquid silica gel is solidified.

Preferably, the waterproof sealing process between the waterproof wire and the wire-through hole further includes:

set a bi-directional wedge sealing ring and a external-threaded nut in sequence around the waterproof wire, and then put the wire through the wire-through hole on the heat sink. Install a wedge part in one side of the bi-directional wedge sealing ring in the gap between the through hole and the waterproof wire, and screw the external-threaded nut into the wire-through hole of the heat sink to make it press tightly to the other side of the bi-directional wedge sealing ring.

Preferably, the external-threaded nut is hollow so that the waterproof wire and the sealing ring can go through from its center. There is a thread structure on the internal wall of the through hole and the thread structure matches with the nut. The wedge part in one side of the sealing ring is installed in the gap between the through hole and the waterproof wire, and the wedge part in the other side is press-stalled tightly when the nut is screwed, making the through-hole, the sealing ring, the waterproof wire and the external-threaded nut fit closely by the deformation caused by the sealing ring being pressed in the above process, thus achieving the waterproof effect.

Preferably, a bi-component insulating sealing glue or other sealing glue is adopted to seal the positive-negative solder joints of the PCB board and the position that the waterproof wire of the heat sink is passed through, and after sealing, it is solidified under room temperature. The other sealing glues refer to all glues that is suitable for sealing except the bi-component sealing glue.

Preferably, fixing the heat sink entirety and the lens set further includes:

Press the heat sink entirety into the inverse buckle structure of the lens set and cause deformation of the solid silica gel ring and the liquid silica gel. The inverse buckle structure of the lens set makes the heat sink and lens set be connected tightly and fixedly, and be protected through the deformation of the solid silica gel ring and the liquid silica gel.

Preferably, the sealing process also includes that the heat sink functioning as lamp holder and heat sink may be cut from profiles, and the heat sink may select various shapes of profile.

A sealing process for an LED module, comprising:

(1) a waterproof wire goes through a wire-through hole of a heat sink to be connected to a positive-negative solder joints on a PCB board, the positive-negative solder joints and the position that the waterproof wire going through are subjected to glue sealing treatment, and a waterproof sealing process is operated between the waterproof wire and the wire-through hole;

(2) fix the PCB board on the heat sink;

(3) fix a lens set into a stationary fixture of a glue machine and place one sealing ring onto the lens set;

(4) apply liquid silica gel along the periphery of the lens set, and the amount of the silica gel is limited to completely sticking the solid silica gel sealing ring;

(5) the heat sink installed with the PCB board and the waterproof wire(s) as processed in step (2) is inversely buckled on the lens set which is set with the solid silica gel ring and the liquid silica gel as processed in step (4), so as to fix the heat sink entirety and the lens set;

(6) make the assembled LED module stand still for 2 hours to make the liquid silica gel be solidified.

No groove is set on the periphery of the lens set; the sealing ring and the liquid silica gel of step (3) and (4) are respectively set on the periphery side by side.

Alternatively, only one groove is set on the periphery of the lens set; one of the sealing ring and the liquid silica gel of step (3) and (4) is set on the groove, and the other is set inside or on the periphery of the groove.

Preferably, the waterproof sealing process between the waterproof wire and the wire-through hole further includes:

set a bi-directional wedge sealing ring and a external-threaded nut in sequence around the waterproof wire and then make the wire go through the wire-through hole of the heat sink. Install the wedge part in one side of the bi-directional wedge sealing ring in the gap between the through hole and waterproof wire, screw the nut into the wire-through hole of the heat sink and make it press tightly to the other side of the bi-directional wedge sealing ring.

Preferably, the external-threaded nut is hollow so that the waterproof wire and the sealing ring can go through from its center. There is a thread structure on the internal wall of the through hole and the thread structure matches with the external-threaded nut. A wedge part in one side of the bi-directional wedge sealing ring is installed in the gap between the through hole and the waterproof wire, and the other side is press-installed by the external-threaded nut screwed in, so that the through hole, the sealing ring, the waterproof wire and the external-threaded nut are fixed tightly due to the deformation of the sealing ring caused by being pressed in the above process and realize the waterproof effect.

A sealing process for LED lighting device which includes a heat sink that including lamp holder units of various numbers, and each lamp holder unit corresponds to one PCB board, a lens set to constitute a LED module, each module is sealed by the sealing process described in claim 1.

A sealing process for an LED module, comprising:

(1) a waterproof wire goes through a wire-through hole of a heat sink to be connected to a positive-negative solder joints on a PCB board, and the positive-negative solder joints and the position that the waterproof wire passing through are subjected to glue sealing treatment, and a waterproof sealing process is operated between the waterproof wire and the wire-through hole;

(2) fix the PCB board on the heat sink;

(3) apply solid gel and liquid silica gel along the inner and external periphery of a lens set, or set solid gel and/or liquid silica gel only along the inner periphery or the external periphery of the lens set;

(4) the heat sink installed with PCB board and the waterproof wire(s) as processed in step (2) is inversely buckled on the lens set which is set with solid silica gel ring and liquid silica gel or on the lens set which is set with solid silica gel ring only or set with liquid silica gel only as processed in step (3), so as to fix the heat sink entirety and the lens set;

Compared with existing technologies, the present invention has the following advantages:

Firstly, at least two silica gel rings completely isolate the LED chip from the external circumstance, preventing any intrusion of moisture or other harmful gases into the chip and PCB board. Compared with film sealing, it is firmer, rendering longer service life. Also, the amount of glue and the product weight can also be reduced compared with glue sealing. Through glue process, special design of the lens set and the solid sealing ring, sealing performance between the lens set and the heat sink is guaranteed.

Sealing performance of the wire-through hole of the heat sink is guaranteed by the bi-directional wedge sealing ring and the nut, together with that the glue is processed on the connection part of the PCB board and the waterproof wire. In addition, the present invention also adopts the "T"-shaped sealing ring, the external-threaded nut, the sealing glue and the threads in the wire-through hole to seal and achieves good sealing effect; meanwhile, the combination of sealing ring and sealing glue further ensures sealing performance that in the case of one of them is failed to sealing, the other could independently functions.

The design of inverse buckle structure of the lens set, together with the duel-protection of the solid silica gel ring and the liquid silica gel, ensure good sealing effect of the lens set and the heat sink. Due to the inverse buckle structure of the lens set, same deformation quantities of the solid silica gel ring and liquid silica gel on the entire ring are resulted in. Consistent pressure of each part ensures uniform sealing of the module and prevents individual defect.

Based on different requirements and demands, heat sinks of various shapes can be selected. The heat sink can include lamp holder units of different numbers to meet the requirements for different powers. Each lamp holder unit independently corresponds to one PCB board, one lens set and sealing silica gel. When a heat sink includes several lamp holder units, sealing of the entire lamp is divided into sealing of several lamp holder units. Sealing of the entire lamp is improved by improving sealing of the lamp holder unit. Moreover, as the perimeter of sealing ring of the lamp holder unit is less than the one of entire lamp, sealing performance can be more easily improved.

Good sealing effect is achieved by this simple process, rendering lower cost, longer service life, no damage to products itself and higher production efficiency: the sealing process of the product reduces the cost, meanwhile achieve good sealing effect, achieving waterproofing, damp proofing, corrosion protection and oxidation protection, thus prolonging the service life and improving the safety of LED lighting products.

Products processed by sealing process above have passed the strict experimental verification, besides common underwater test, it includes also the 100° C. boiling red ink test. Each of the two protections shall stand in the boiling water test for over 30 minutes. After boiling, it will be immediately placed into the cool water of room temperature to test its waterproof performance with shock chilling. All together, the two protections shall get through boiling water and shock chilling test of 3 hours, over 6 cycles.

BRIEF DESCRIPTION OF THE DRAWINGS

FIG. 17b is a section view corresponding to FIG. 17a;

DETAILED DESCRIPTION OF THE INVENTION

Embodiment 1

Figure 1A:
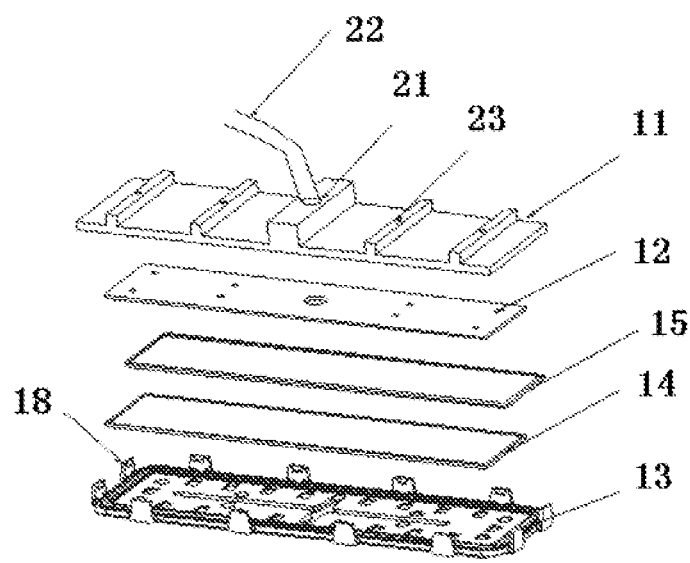
FIG. 1A is an explosive view of one embodiment of LED module.
Figure 1B:
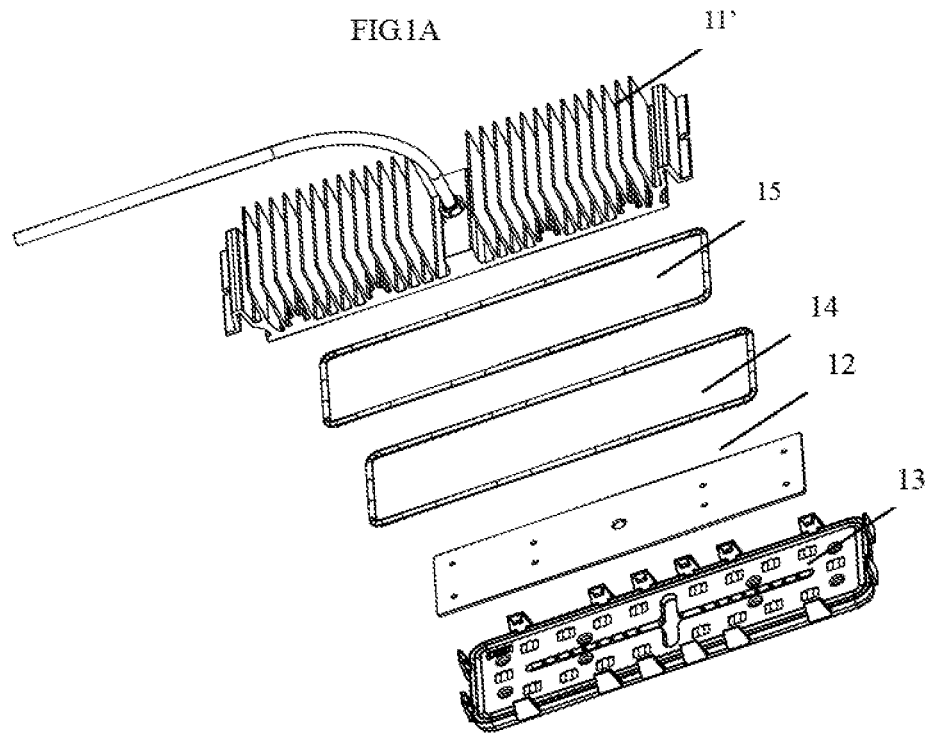
FIG. 1B is an explosive view of another embodiment of LED module.
Figure 2:
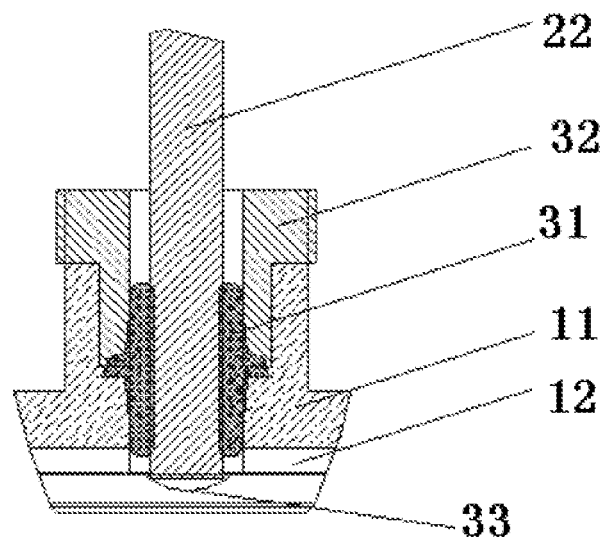
FIG. 2 is a section view of the wire-through hole structure.
Figure 3:
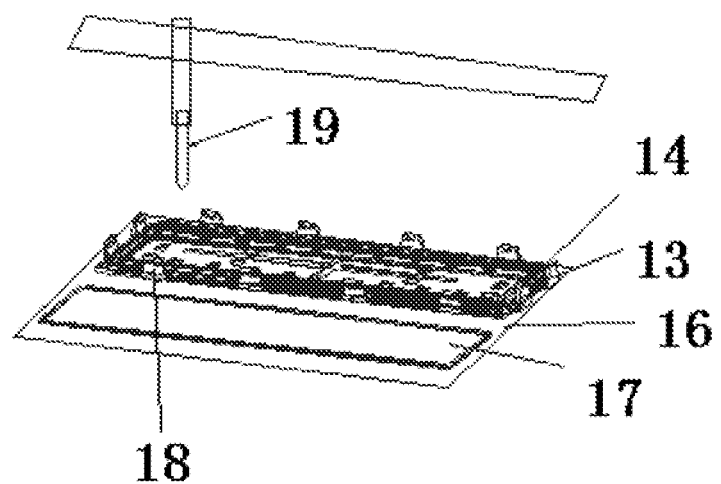
FIG. 3 is a schematic diagram of dispensing.

With reference to FIGS. 1-3, it is a type of technical proposal for LED sealing process: an LED lighting device including a heat sink 11 (in the present invention, heat sink is same with radiation holder. To avoid any confusion, hereby radiation holder is referred to as heat sink), a PCB board 12, a LED chip, a sealing silica gel and lens set 13. The LED chip is welded on the PCB board 12, and the PCB board 12 is fit with the heat sink 11. The lens set 13 is set above the LED chip.

The heat sink can include one lamp holder unit or several lamp holder units. Each lamp holder unit corresponds to one PCB board 12, one lens set 13 and sealing silica gel. Hereinafter single lamp holder unit is adopted as an example:

The heat sink 11 could be cut from a profile, functioning both as lamp holder and heat sink. The processing is simple and lower cost. Profile of different shapes for the heat sink can be adopted based on different demands.

On the heat sink 11, a through hole 21 with step-shaped cross section is set through which the waterproof wire 22 of the PCB board 12 is passed. A sealing ring 31 is set in the gap between the through hole 21 and the waterproof wire 22. The sealing ring 31 is bi-directional wedge shape with a wedge part in one side installed in the gap between the through hole 21 and the waterproof wire 22, and the other wedge part in another side fixed downside with the nut 32, making the through hole 21 and the waterproof wire 22 fit well through the sealing ring 31.

On the heat sink 11, the PCB board 12 is set. The heat sink 11 and the PCB board 12 form surface-contact between them and are fixed by screws. Heat generated on the PCB board 12 can be rapidly dissipated through the heat sink 11.

An LED light source is set on the PCB board 12, and the LED light source directly covers on the PCB board 12, wherein the LED light source can be with or without holder.

The sealing silica gel includes the solid silica gel ring 14 installed on the lens set 13 and the silica gel ring 15 formed by the liquid silica gel pasted on one side of the solid silica gel ring 14. Grooves are set on the lens platform corresponding to the side of the solid silica gel ring 14 for pasting liquid silica gel.

On the plane of the lens set 13 several lens are set, each of which corresponds to one LED light source.

On the periphery of the lens set 13, inverse buckle structure 18 is designed, by which the heat sink 11 installed with the PCB board 12 is inversely buckled on the lens set 13 that is set with the silica gel ring 14 and the liquid silica gel 15 and is tightly fixed.

Principles of the technology are:

(1) the waterproof wire goes through the wire through-hole of the heat sink and then connect to the positive-negative solder joints on the PCB board, and the positive-negative solder joints and the positions that the waterproof wire going through is sealed with glue, and a waterproof sealing process is operated between the waterproof wire and wire-through hole;

(2) fix the PCB board on the heat sink;

(3) fix the lens set with internal and external grooves on a stationary fixture of a glue machine and place a sealing ring into the internal groove of the lens set;

(4) paste evenly a ring of liquid silica gel along another groove of the lens set and the amount of liquid silica gel is limited to completely sticking the solid silica gel sealing ring;

(5) solidify the glued lens set under normal temperature for 2 hours;

(6) the heat sink installed with the PCB board and the waterproof wire(s) as processed in step (2) is inversely buckled on the lens set which is set with the solid silica gel ring and the liquid silica gel as processed in step (5), and then fix the heat sink entirety and the lens set. At least two waterproof sealing rings completely isolate the LED chip from the external circumstance to prevent any intrusion of moisture or other harmful gases into the chip and PCB board. Compared with film seal, it is firmer and has longer service life, and also can reduce the amount of glue and the product weight when compared to the glue sealing.

It should be noted that the wire-through hole can be sealed by other devices. As shown in FIGS. 7-11, the present invention provides a wire-through hole sealing device for sealing a wire-through hole 110 through which an electric wire 140 (or a waterproof wire) goes. The wire-through hole sealing device includes a "T"-shaped sealing ring 130 set around the sealing line and an external-threaded nut 120 set around the downside of the "T"-shaped sealing ring 130.

Figure 7:
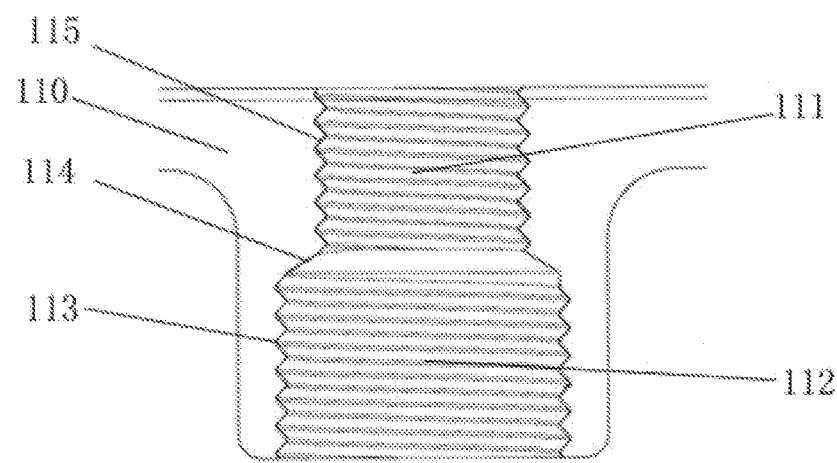
FIG. 7 is an overall stereoscopic view of the second embodiment of the waterproof wire through hole of the present invention, a section view of the wire-through hole.

In the Embodiment, as shown in FIG. 7, the wire-through hole 110 is of cylindrical structure which is narrow in the upside and wide in the downside, namely the upper section of the wire-through hole 110 is a narrow caliber part 111 and the lower section is a wide caliber part 112. A first transitional platform 114 is set at the parting position of the two parts, and a first threads 113 are set on the internal side of the wide caliber part 112 of the wire-through hole 110; wherein the first transitional platform 114 is of certain inclination; the narrow caliber part 111 is close to the circuit board and the wide caliber part 112 is away from the circuit board.

Figure 8:
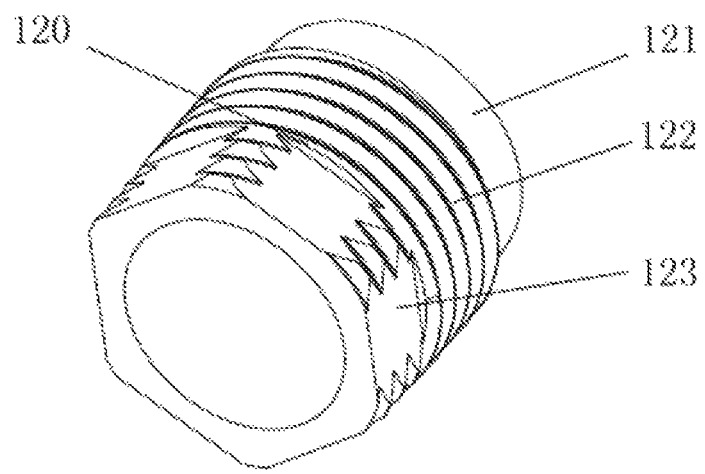
FIG. 8 is a structure diagram of the external-threaded nut in waterproof wire through hole sealing.

In the Embodiment, as shown in FIG. 8, the external-threaded nut 120 is hollow on which second threads 122 are set on its external surface which matches the primary threads 113. Specifically, the external-threaded nut 120 is divided into three sections, which are of same internal diameter. The upper section of the external-threaded nut 120 is upper narrow part 121, the second threads 122 is set on the external side of the middle section of the external-threaded nut 120, and the external diameter of the upper narrow part 121 is less than that of the middle section of the external-threaded nut 120. External thread diameter of the middle section of the external-threaded nut 120 matches the internal thread diameter of the wide caliber part 112 of the wire-through hole 110; lower section of the external-threaded nut 120 is set with a tightening structure. Specifically, it could be a hexagonal structure 123. Surely, it is only one embodiment. The tightening structure can also be realized by other forms which are not limited herein. Certainly, diameters of the three section of the external-threaded nut 120 can be determined based on specific conditions and the external-threaded nut 120 also can not be divided into three sections; instead it could also be one section with threads set on the external surface. It is subject to specific situation, not limited herein.

Figure 9:
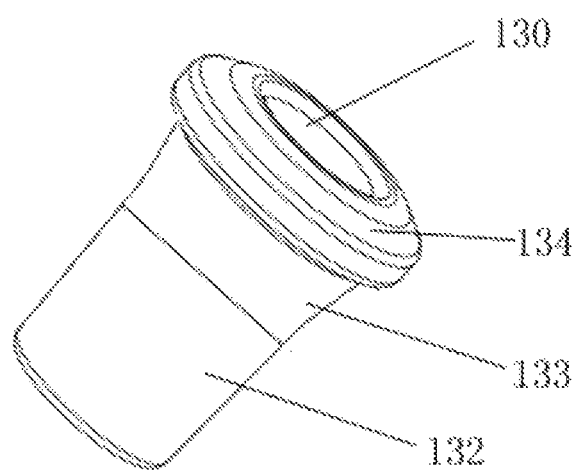
FIG. 9 is a structure diagram of the "T"-shaped sealing ring in waterproof wire through hole sealing.
Figure 10:
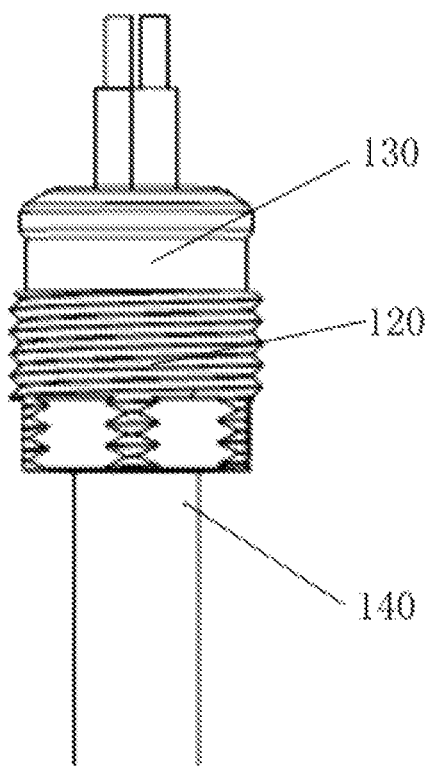
FIG. 10 is a structure diagram of the external-threaded nut and "T"-shaped sealing ring set around the electric wire in waterproof wire through hole sealing.
Figure 11:
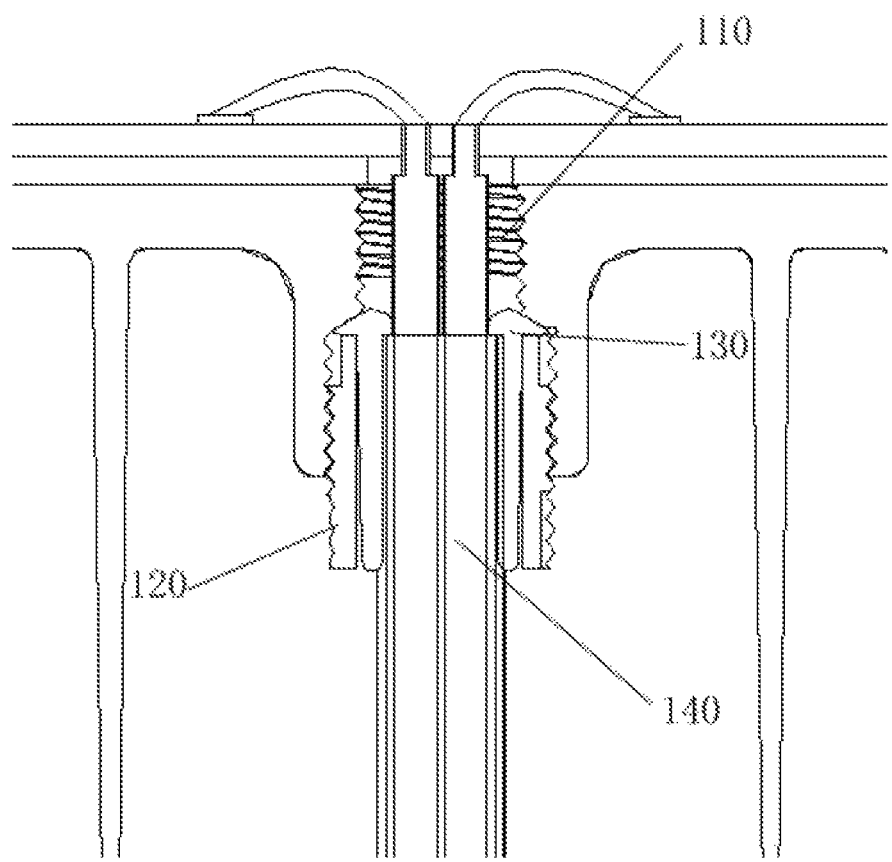
FIG. 11 is a section view of specific embodiment in waterproof wire through hole sealing.

In the Embodiment, the "T"-shaped sealing ring 130 is hollow, wide in the upper side and narrow in the downside as shown in FIG. 9. In the upper side it is a wide corona-part 134 and in the lower end it is a narrow part 132, and between the two parts a second transitional platform 133 is set. The narrow part 132 is of circular platform shape, the diameter of the end face of the narrow part 132 at the parting position of the narrow part 132 and the corona-part 134 is larger than the diameter of another end face of the narrow part 132. Surely the narrow part 132 can be a straight cylinder either. The circular platform shape of the narrow part 132 of the Embodiment is designed for facilitating setting the external-threaded nut 120 on the narrow part 132 of the "T"-shaped sealing ring 130. The diameter of the corona-part 134 of the "T"-shaped sealing ring 130 is larger than that of the upper narrow part 121 of the external-threaded nut 120. After the electric line 140 passes through the "T"-shaped sealing ring 130, the external-threaded nut 120 is set around the narrow part 132 of the "T"-shaped sealing ring 130 and one end face of the external-threaded nut 120 is pressed tightly to the second transitional platform 133 of the "T"-shaped sealing ring. Through the second threads on the external-threaded nut 120, the electric line with the "T"-shaped sealing ring and the external-threaded nut is screwed into the wide caliber part 112 of the wire-through hole. As shown in FIG. 11, the upper end face of the corona-part 134 of the "T"-shaped sealing ring 130 is set against the first transitional platform 114 at the parting position of the narrow caliber part 111 and the wide caliber part 112 of the wire-through hole. The upper end of the external-threaded nut 120 and the lower end of the narrow caliber part 111 of the wire-through hole press the "T"-shaped sealing ring 130 to deform and thus make the "T"-shaped sealing ring, the electric wire and the wire-through hole fit tightly, realizing sealing effect.

In the Embodiment, after the electric wire 140 is connected to the wire-through hole through the external-threaded nut 120 and the "T"-shaped sealing ring 130, sealing colloids is filled into the gap between the wire-through hole and the electric wire 140 above the "T"-shaped sealing ring 130 for further sealing the wire through-hole. Surely, the type of sealing glue is subject to specific conditions, not limited herein. The present invention adopts "T"-shaped sealing ring, external-threaded nut, sealing glue and threads in the wire-through hole to seal, and adopts the combination of sealing ring and sealing glue to ensures that when one of them failed in sealing, the other will independently functions.

In the Embodiment, third threads 115 are set on the narrow caliber part 111 upper of the wire through-hole. Sealing colloids are attached to the third thread 115, thus the adhesive force of the sealing colloids could be enhanced. It is subject to specific condition, not limited herein.

In the Embodiment, the second transitional platform 133 of the "T"-shaped sealing ring 130 is of certain inclination. When one end face of the external-threaded nut 120 is pressed tightly against the second transitional platform 133 of the "T"-shaped sealing ring 130, inward and upward forces are generated as following: (1) the inward force presses the external-threaded nut 120 tightly against the "T"-shaped sealing ring 130, meanwhile the "T"-shaped sealing ring 130 is pressed against the electric wire 140; thus the electric wire 140 and "T"-shaped sealing ring 130, and the "T"-shaped sealing ring and the external-threaded nut 120 are tightly fit without any gaps; (2) the top of the external-threaded nut 120 is pressed tightly against the bottom of the corona-part 134 of the "T"-shaped sealing ring 130 and in the meantime the top of the corona-part 134 of the "T"-shaped sealing ring 130 is pressed tightly against the first transitional platform 114.

In the Embodiment, the external surface of the electric wire 140 could be set with protective cover which can prevent from water and function for isolation. It is subject to specific condition, not limited herein.

The wire-through hole sealing device provided by the present invention is implemented as below:

Firstly, the "T"-shaped sealing ring 130 is set around the electric wire 140, namely the electric wire 140 is passed through the narrow part 132 and the corona-part 134 of the "T"-shaped sealing ring 130 in sequence; the external-threaded nut 120 is set around the narrow part 132 of the "T"-shaped sealing ring 130; as the diameter of the corona-part 134 of the "T"-shaped sealing ring 130 is larger than the diameter of the upper narrow part 121 of the external-threaded nut 120, therefore the second transitional platform 133 of the "T"-shaped sealing ring 130 contacts the upper end face of the upper narrow part 121 of the external-threaded nut 120; the electric wire covered with the "T"-shaped sealing ring 130 and the external-threaded nut 120 is passed through the wide caliber part 112 and the narrow caliber part 111 of the wire-through hole in sequence, and is connected to the internal side of the wire-through hole through the first threads 113 on the wire-through hole and the second threads 122 on the middle section of the external-threaded nut; here the second transitional platform 133 of the "T"-shaped sealing ring 130 is pressed against the first transitional platform 114 at the connection part of the narrow caliber part 111 and the wide caliber part 11 of the wire-through hole 2. Under the press of the upper end of the external-threaded nut 120, the "T"-shaped sealing ring 130 is pressed by the upper end of the external-threaded nut 120 and the first transitional platform 114 to deform and thus it can tightly fit the "T"-shaped sealing ring with the electric wire and the wire-through hole for sealing; at last, sealing colloids is filled into the gap formed by the wire-through hole and the electric wire 140 above the "T"-shaped sealing ring 130 for further sealing.

In conclusion, the Embodiment provides with a wire-through hole sealing device, wherein the wire-through hole is narrow upside and wide downside, and with threads set within. The electric wire is connected to the wide caliber part of the wire through-hole through a hollow "T"-shaped sealing ring and a hollow external-threaded nut. Wherein the "T"-shaped sealing ring includes a narrow part and a wide corona-part, between which a second transitional platform of certain inclination is set. The "T"-shaped sealing ring is set around the electric wire and the external-threaded nut is set on the narrow part of the "T"-shaped sealing ring with one of its end face pressed tightly against the second transitional platform of the "T"-shaped sealing ring. The external-threaded nut is connected to the wire through-hole by thread connection. The corona-part of the "T"-shaped sealing ring is pressed against the first transitional platform with certain inclination on the parting of the wide caliber part and the narrow caliber part of the wire-through hole, in addition the gap between the electric wire and the wire-through hole is filled with sealing colloids. The present invention has realized double sealing by the "T"-shaped sealing ring, external-threaded nut, sealing glue and the threads in the wire through-hole.

The present invention also provides a wire-through hole sealing device of another embodiment. Referring to FIG. 15 to FIG. 20, the wire-through hole sealing device of this embodiment is applied to realize sealing waterproofness between an electric wire and a wire-through hole of a heat sink 30, wherein the electric wire in this embodiment is, for example, a waterproof male wire 20.

The structure of the wire-through hole, which is as shown in FIG. 7, comprises two parts different in caliber, i.e., a narrow caliber part 111 and a wide caliber part 112. A first transitional platform 114 is disposed at the parting of the narrow caliber part 111 and the wide caliber part 112, and a first thread 113 is provided on the internal side of the wide caliber part 112 downside of the wire-through hole 110, wherein the first transitional platform 114 has an inclination angle relative to side faces of the narrow caliber part 111 and the wide caliber part 112. The narrow caliber part 111 is close to a circuit board in a target position provided by the wire-through hole, and the wide caliber part 112 is far away from the circuit board in the target position.

The wire-through hole sealing device comprises:

a "T"-shaped sealing ring 230 which is shaped similarly to the above-mentioned "T"-shaped sealing ring 130, and is hollow and comprises a wide corona part 234 and a narrow part 232 with a second transitional platform disposed between the narrow part 232 and the corona part 234, where the "T"-shaped sealing ring 230 and the above-mentioned "T"-shaped sealing ring 130 differ in that the narrow part 232 of the "T"-shaped sealing ring 230 is longer than the narrow part 132 of the "T"-shaped sealing ring 130 to adapt to the arrangement of the wire-through hole sealing device of this embodiment;

a waterproof threaded pipe 231 which is of a hollow structure with a main body part 231a and a head 231b, wherein the main body part 231a is provided with a first threaded section a1 and the head 231b is provided with a second threaded section b1; and a counter bored hole b2 is provided in the head 231b downwards from an upper end face thereof;

a lock catch 235 which is of a hollow structure with a lower end 235a placeable in the counter bored hole b2 of the waterproof threaded pipe 231 and a lock catch claw teeth 235b at the upper end; and a waterproof threaded pipe cap 236 which is of a hollow structure and in which a third threaded section matching the second threaded section b1 of the waterproof threaded pipe 231 is disposed.

When the wire-through hole sealing device of this embodiment is used for sealing, the "T"-shaped sealing ring 230 may first be sheathed on the waterproof male wire, and then the waterproof male wire is allowed to run through the wire-through hole of the heat sink with the upper surface of the corona part 234 of the "T"-shaped sealing ring 230 attached on the first transitional platform 114 of the wire-through hole. Then, the waterproof threaded pipe 231 is sheathed from the narrow part of the "T"-shaped sealing ring 230, and the first threaded section a1 of the waterproof threaded pipe 231 is engaged with the first thread 113 of the wire-through hole to press the "T"-shaped sealing ring 230 causing deformation of the corona part 234 and the narrow part 232 thereof. Moreover, after the corona part 234 deforms, sealing between the wire-through hole and the corona part 234 of the "T"-shaped sealing ring 230 and sealing between the corona part 234 of the "T"-shaped sealing ring 230 and the waterproof male wire are achieved simultaneously. Also, the narrow part 232 deforms to achieve sealing between the waterproof male wire and the narrow part 232 of the "T"-shaped sealing ring 230. Next, the lock catch 235 is sheathed on the "T"-shaped sealing ring 230 with the lower end 235a of the lock catch 232 placed in the counter bored hole b2 of the waterproof threaded pipe 231. The waterproof threaded pipe cap 236 is then applied to cover above the lock catch 235 and the threaded section within the waterproof threaded pipe cap 236 is allowed to be engaged and screwed up with the second threaded section b1 of the head of the waterproof threaded pipe 231. The waterproof threaded pipe cap 236 presses the lock catch claw teeth under the thread engagement action with the second threaded section of the head of the waterproof threaded pipe 231. Thus, the lock catch claw teeth 235b are caused to press the upper end of the narrow part 232 of the "T"-shaped sealing ring 230, and then the narrow part 232 of the "T"-shaped sealing ring 230 presses the waterproof male wire, thereby locking the waterproof male wire.

This embodiment produces the following effects:

1) The anti-lifting/pulling performance of the waterproof wire of the LED module is improved.

The waterproof threaded pipe cap presses the lock catch claw teeth of the lock catch under the engagement action with upper end thread of the waterproof threaded pipe, and the lock catch claw teeth are caused to press the upper end of the "T"-shaped sealing ring and lock the waterproof male wire. Compared with the previous embodiment, this embodiment has a waterproof male wire fastening structure added. As a result, the probability of the waterproof male wire becoming loose due to a relative displacement from the heat sink under the action of lifting and pulling forces is greatly reduced.

2) The sealing performance at the wire-through hole of the LED module is improved.

The wire-through hole sealing device is provided with the pressing structures at both the corona part and the narrow part of the "T"-shaped sealing ring, allowing for improvement in sealing waterproofness between the "T"-shaped sealing ring and the inner wall of the heat sink and that between the "T"-shaped sealing ring and the waterproof male wire. Moreover, the lock catch claw teeth are pressed to produce a locking and pressing effect on the waterproof male wire. As a result, the degradation of the sealing waterproofness caused by a displacement of the waterproof male wire under the action of certain lifting and pulling forces is avoided.

Specific technological processes are as below:

1. Set the bi-directional wedge sealing ring and the external-threaded nut in sequence on the waterproof wire and then get the wire through the wire-through hole of the heat sink. Install the wedge part in one side of the sealing ring in the gap between the through hole and the waterproof wire, screw the external-threaded nut into the wire-through hole of the heat sink to press tightly the other side of the bi-directional wedge sealing ring.

The external-threaded nut is hollow through which the waterproof wire and the sealing ring can go through from its center. Thread structure is set on the internal wall of the through-hole and matches with the external-threaded nut. A wedge part in one side of the sealing ring is installed in the gap between the through hole and the waterproof wire, and the other wedge part in another side is installed tightly by screwing the nut, which makes the through hole, the sealing ring, the waterproof wire and the external-threaded nut fixed tightly by the deformation of the sealing ring through the press in above process and realize waterproof effect.

2. Pass the waterproof wire through the wire through-hole of the heat sink, connect it to the positive-negative solder joints on the PCB board, and then use bi-component insulation paste or other sealing glue for sealing 33 on the positive-negative solder joints on the PCB board and the position where the waterproof wire of the heat sink is passed through. After sealing, solidify for 1 hour under normal temperature to further enhance the sealing effect of waterproof wire at the through hole. Preferably, resilient epoxy glue is selected for the bi-component insulation paste, which adhered with metal provides excellent anti-shock and chemicals-resistance performance.

3. Fix the PCB board on the heat sink by fitting surface through a fastening part.

4. Fix the lens set with internal and external grooves into the stationary fixture of the glue machine 16, and put a solid silica gel ring 14 of suitable size into the internal groove of the lens set.

5. Set desktop robot and glue machine, use the glue gun 19 to evenly paste a circle of liquid silica gel along the external groove of the lens set in an amount that it can completely sticking to the solid silica gel ring, and then solidify under room temperature for 2 hours. Silica gel is selected for the liquid glue for its excellent viscidity, anti-shock and UV-resistance performance to metal and PC material.

6. the heat sink installed with the PCB board and the waterproof wire processed in step (2) is inversely buckled on the lens set which is set with solid silica gel ring and liquid silica gel that processed in step (3), and completely press the heat sink entirety into the inverse buckle structure of the lens set through which the heat sink and the lens set are tightly connected, and double protection is realized through the deformation of the solid silica gel ring and the liquid silica gel.

Embodiment 2

Processing steps of Embodiment 2 are similar to that of Embodiment 1, and the differences are as following: set the solid silica gel ring in the external groove of the lens set, and then paste a circle of liquid silica gel evenly along the internal groove of the lens set. For other processing steps, please refer to Embodiment 1.

Embodiment 3

Only one groove is set on the periphery of the lens set; one of the sealing ring and the liquid silica gel is set on the groove, and the other is set inside or on the periphery of the groove.

Embodiment 4

No groove is set on the periphery of the lens set; the sealing ring and liquid silica gel are respectively set on the periphery side by side.

In other words, a sealing process for an LED module, comprising:

(1) the waterproof wire goes through the wire throughhole of the heat sink and then connects to the positive-negative solder joints on the PCB board, wherein the positive-negative solder joints and the position that the waterproof wire passing through are subjected to glue sealing treatment, and a waterproof sealing process is operated between the waterproof wire and wire-through hole;

(2) fix the PUB board on the heat sink;

(3) place solid silica gel and paste liquid silica gel along the periphery or internal surface of the lens set respectively, or place solid silica gel and/or paste liquid silica gel only along the periphery or internal surface;

(4) the heat sink installed with PCB board and waterproof wire(s) as processed in step (2) is inversely buckled on the lens set which is set with solid silica gel ring and liquid silica gel or set with only the solid silica gel ring or set with only the liquid silica gel as processed in step (3) and fix the heat sink entirety and the lens set;

Certainly, for the lens set, only an external circle and no internal circle can be set, or vice versa. Similarly, both solid silica gel and liquid glue, or either of them can be set on it.

These are not the emphasis of the present invention, which only focuses on fixed connection of the heat sink entirety and the lens set.

Figure 4:
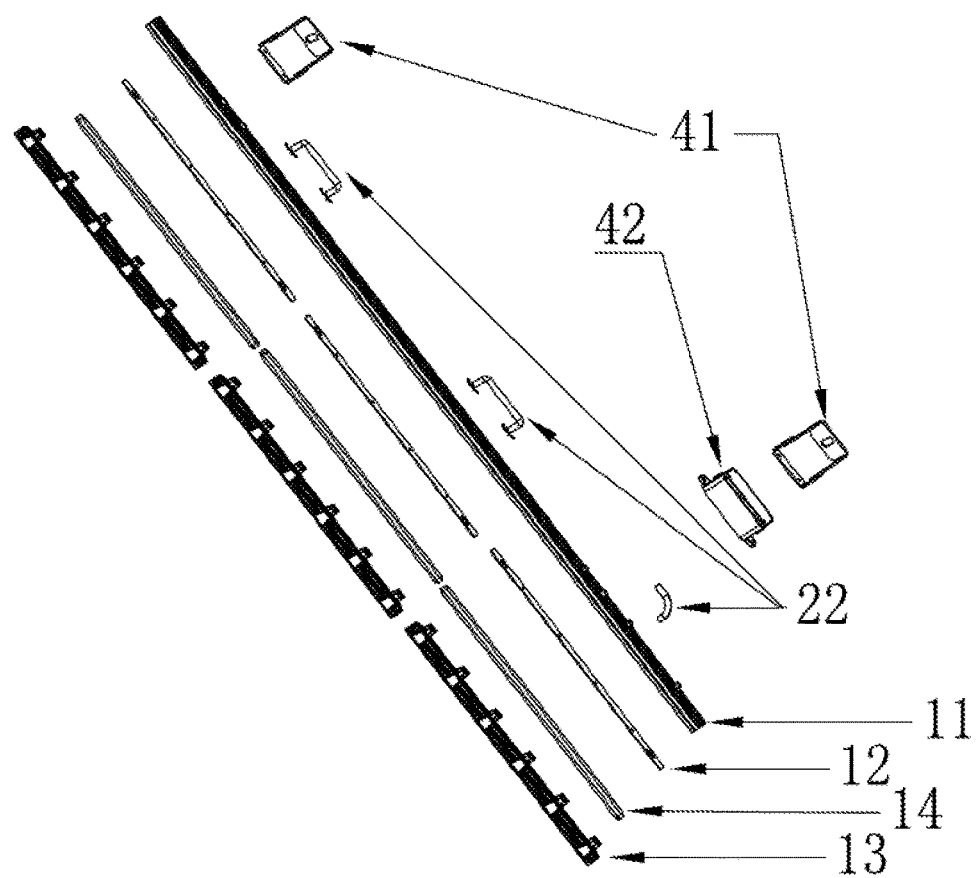
FIG. 4 is an explosive view of one embodiment of LED lighting device.
Figure 5:
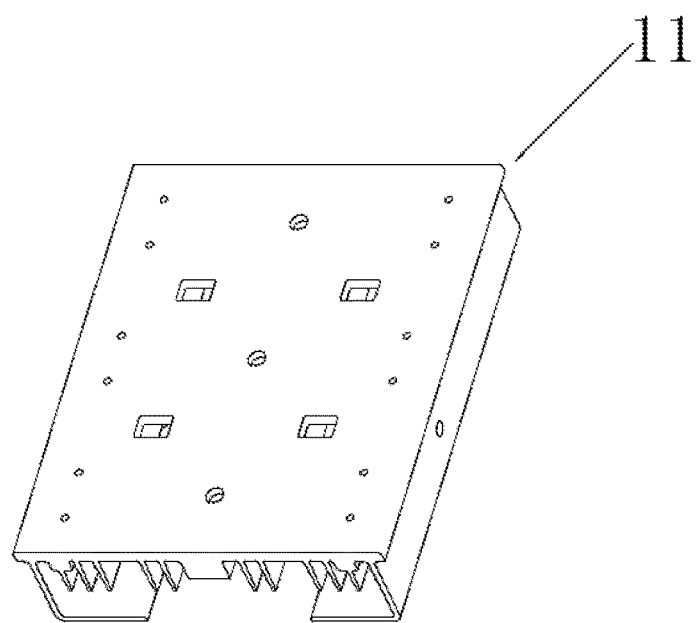
FIG. 5 is structure diagram of one embodiment of LED heat sink.

Application 1:

As shown in FIG. 4 and FIG. 5, it is a sealing process for an LED lighting device, wherein the LED lighting device includes a heat sink 11 with lamp holder units of different numbers. The lamp holder units on the heat sink 11 can be horizontally arranged as shown in FIG. 4, or vertically arranged in FIG. 5. Each lamp holder unit corresponds to one PCB board and one LED module formed one lens set. Each LED module is sealed in either of the two above sealing processes. On the heat sink, power supply waterproof case 42 and installation holder 41 is set for installing external driving power supply. Lighting device is rotated and fixed through the installation holder.

Figure 6:
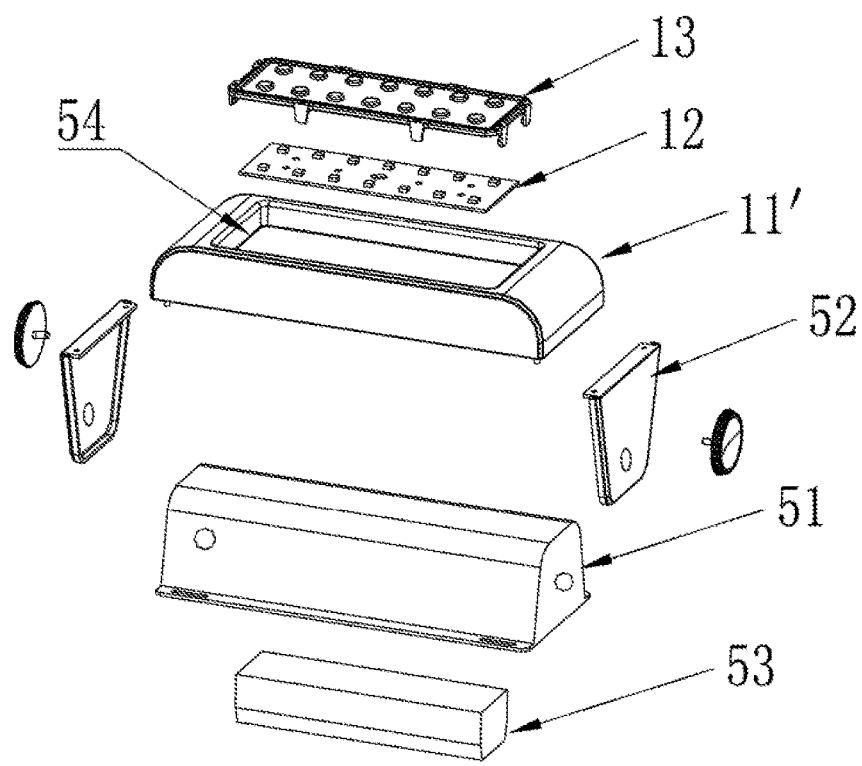
FIG. 6 is structure diagram of the sealing process of one embodiment of the LED lighting device.

As shown in FIG. 6, it is a sealing process for an LED lighting device, wherein the LED lighting device includes a lamp holder 11', a lens set 13, a PCB board 12 and a power pack 51. The lamp holder 11' replaces the heat sink holder 11. The lamp holder 11', the PCB board 12 and the lens set 13 form a LED module, for which one of the above two sealing processes is adopted for sealing operation. The lamp holder, through the lamp holder connector 52, is connected to the power pack 51, within which the driving power supply 53 is set. On the lamp holder, a holding groove 54 is set. At the bottom of the holding groove 54, grooves matching the inverse buckle of the lens set are set into which the lens set can be inversely buckled. The lens set 13 together with the PCB board 12 is fixed in the holding groove 54. An LED light source is set on one side of the PCB board and, on the other side it is connected to the bottom face of the holding groove 54 for heat dissipation. The lamp holder is made of aluminum sheet of good heat conduction performance.

Figure 12:
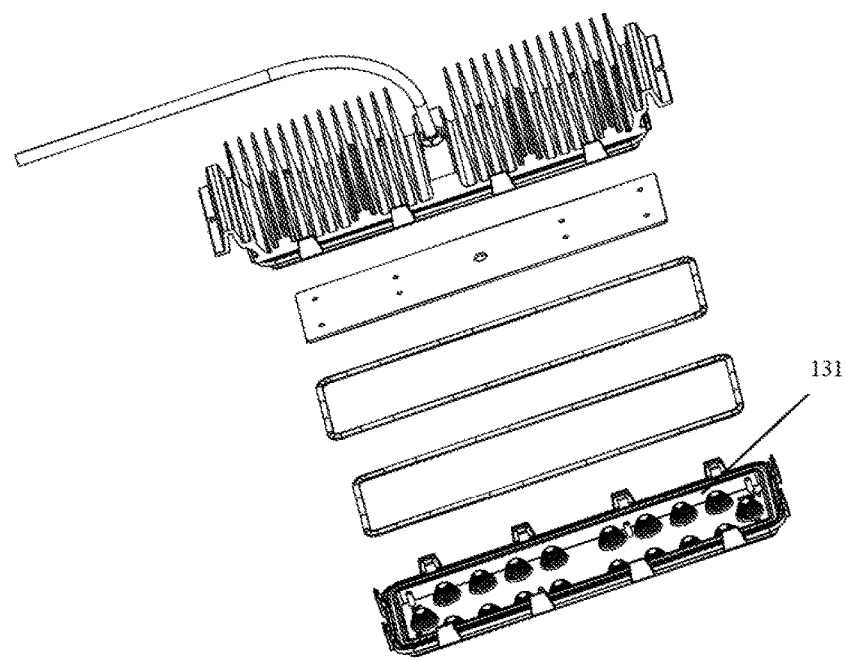
FIG. 12 is a structure diagram of another LED lighting device to which the LED sealing process of the present invention is applicable.

Application 2:

As shown in FIG. 1B, it is a figure of application of a type of LED module to which the sealing process of the present invention is applicable. Compare with FIG. 1, suitable heat sink for the present invention can be the shape as shown in FIG. 12. On the heat sink 11', dissipation fins can be set; also heat conduction holders can be set at the two sides. At least one end of the heat conduction holder of the heat sink should be set with "n" shape buckle and "U" shape neck on the internal side of the side frame through which the heat sink and the side frame components are engaged and fixed and forming surface contact.

In other words, compared with FIG. 1, the present invention varies that for the heat sink 11', a heat sink with dissipation fins of better dissipation effect is adopted while other components are basically similar.

In other words, LED modules to which the sealing process of the present invention is applicable are not limited to the shape of heat sinks.

Application 3:

Similarly, for another LED module to which the seal process of the present invention is applicable, the LED lenses are not limited to the lens format shown in FIG. 1. Please refer to FIG. 12. Lens format 131 of the LED module to which the present invention is applicable may be any existing form. Herein no detailed introduction will be given.

Figure 13:
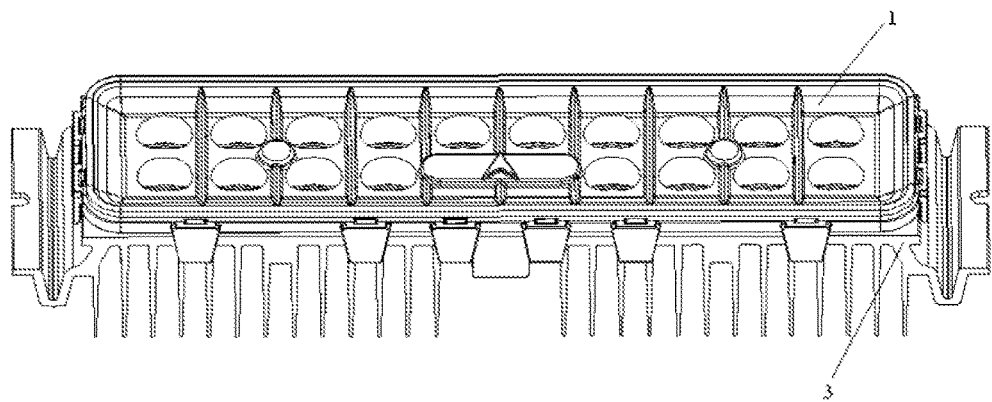
FIG. 13 is a structure diagram of a LED module to which the present invention is applicable.
Figure 14:
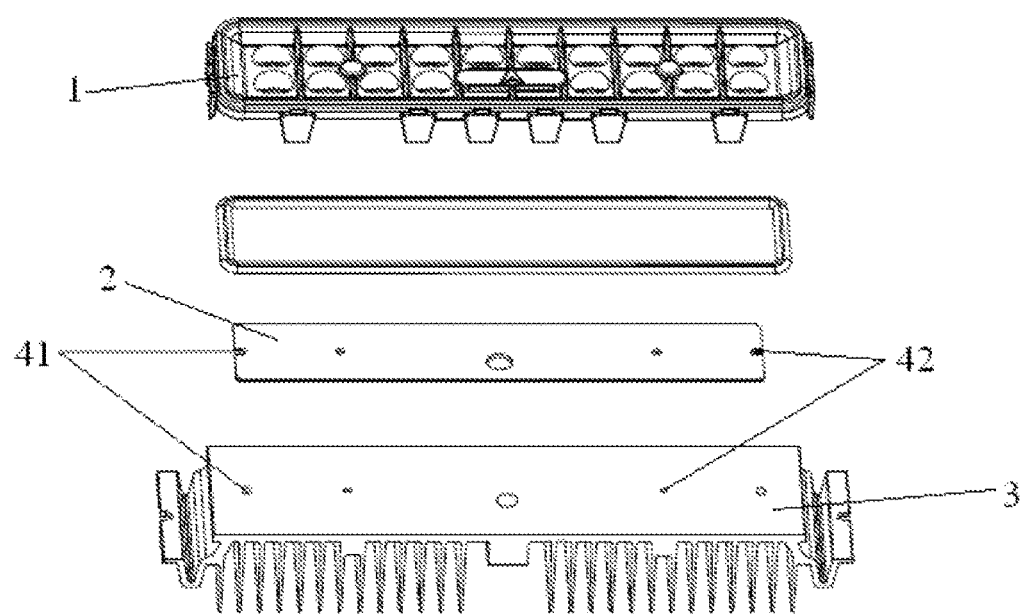
FIG. 14 is an explosive view of a LED module to which the present invention is applicable.
Figure 15:
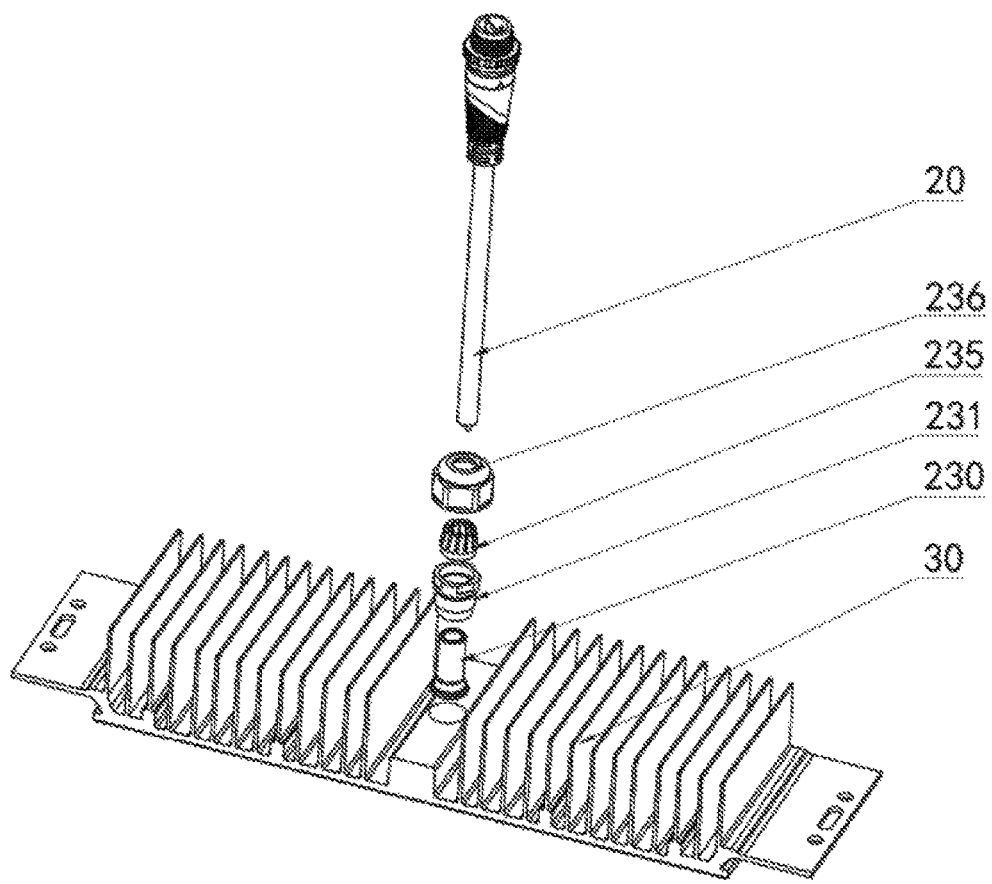
FIG. 15 is a breakdown structure diagram of a wire-through hole sealing device of another embodiment of the present invention.
Figure 16:
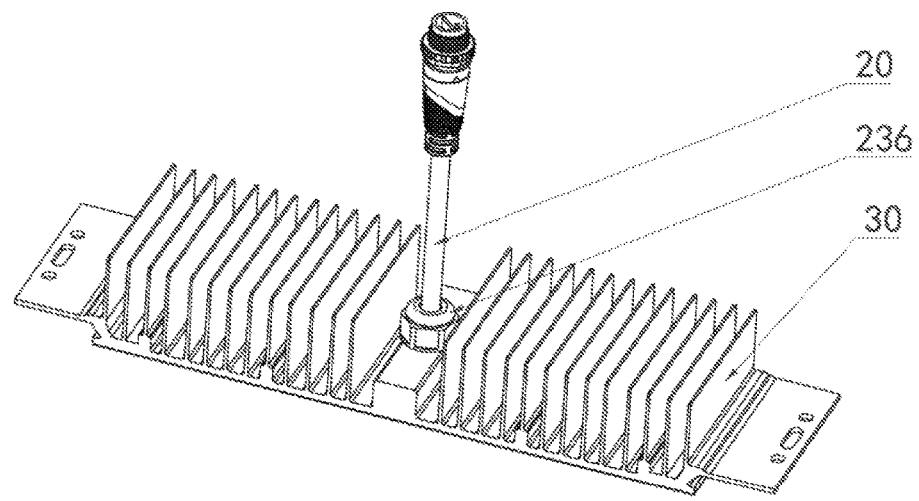
FIG. 16 is a space diagram of an assembled structure of the wire-through hole sealing device shown in FIG. 15.
Figure 17A:
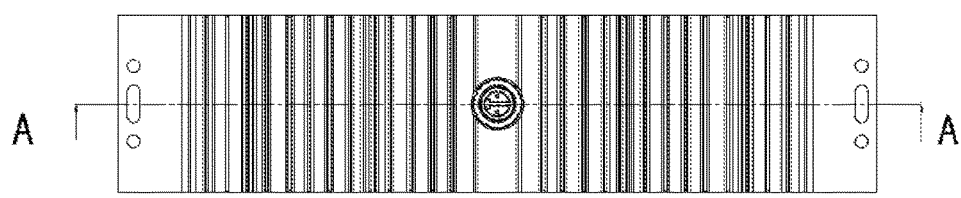
FIG. 17a is a cross-section position diagram of the assembled structure of FIG. 16.
Figure 17B:
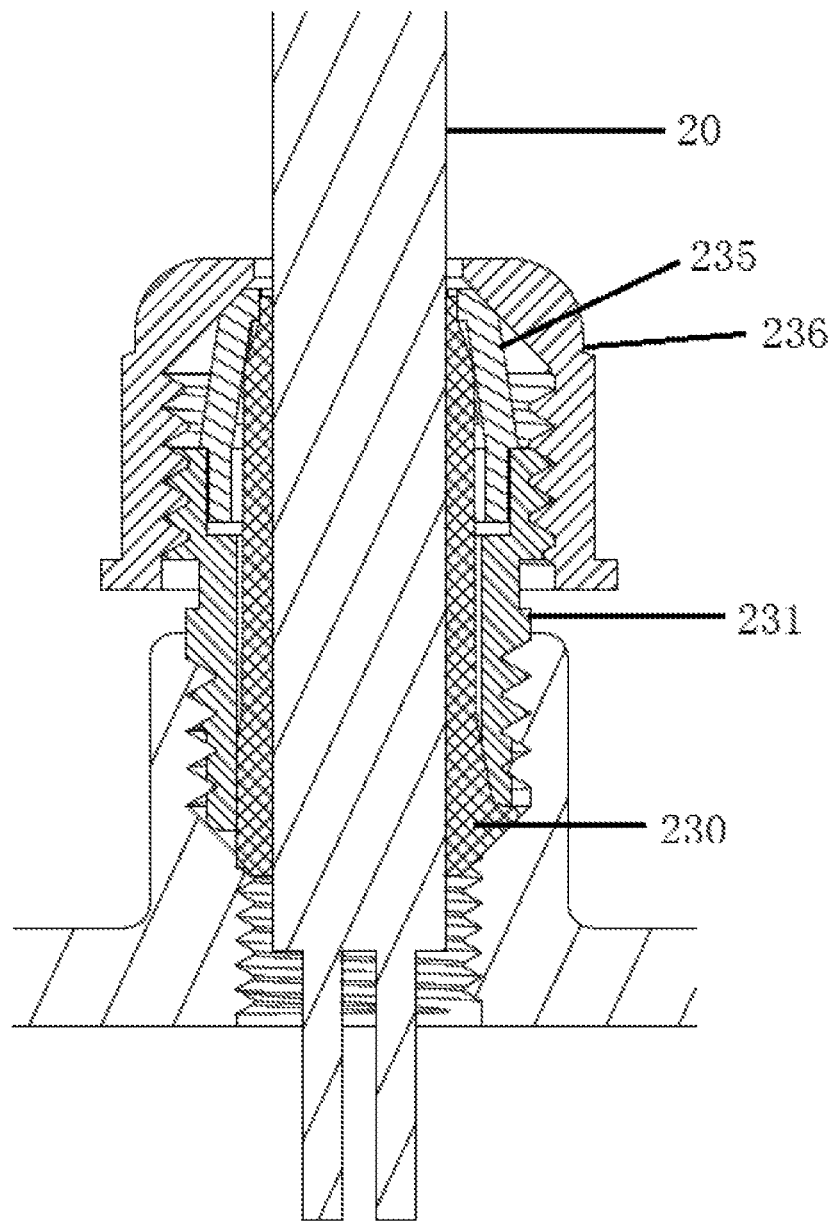
Figure 18:
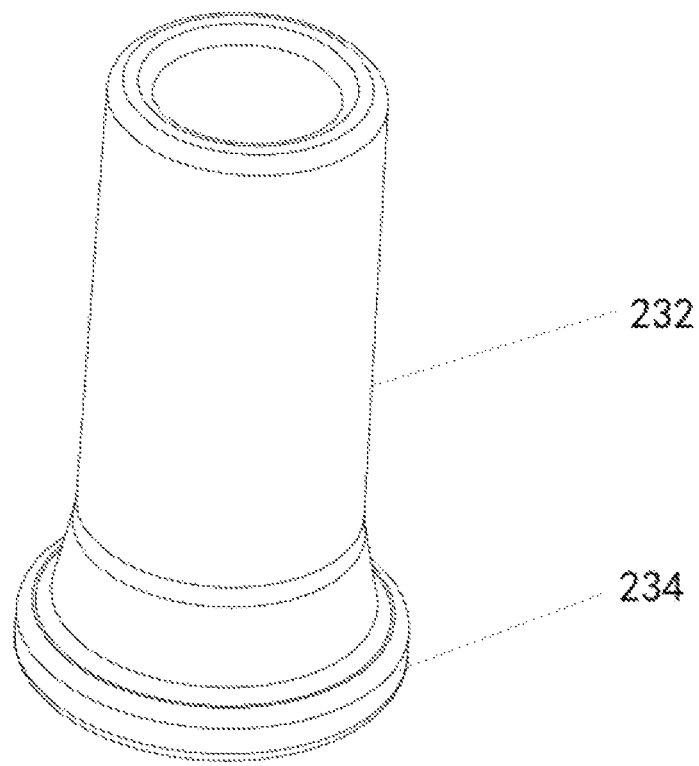
FIG. 18 is a space structure diagram of a "T"-shaped sealing ring in FIG. 15.
Figure 19:
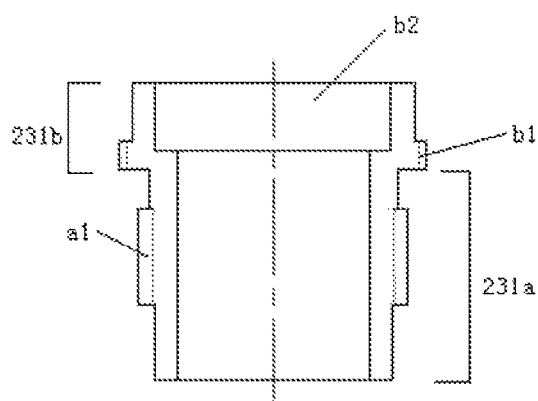
FIG. 19 is a space structure diagram of a waterproof threaded pipe in FIG. 15.
Figure 20:
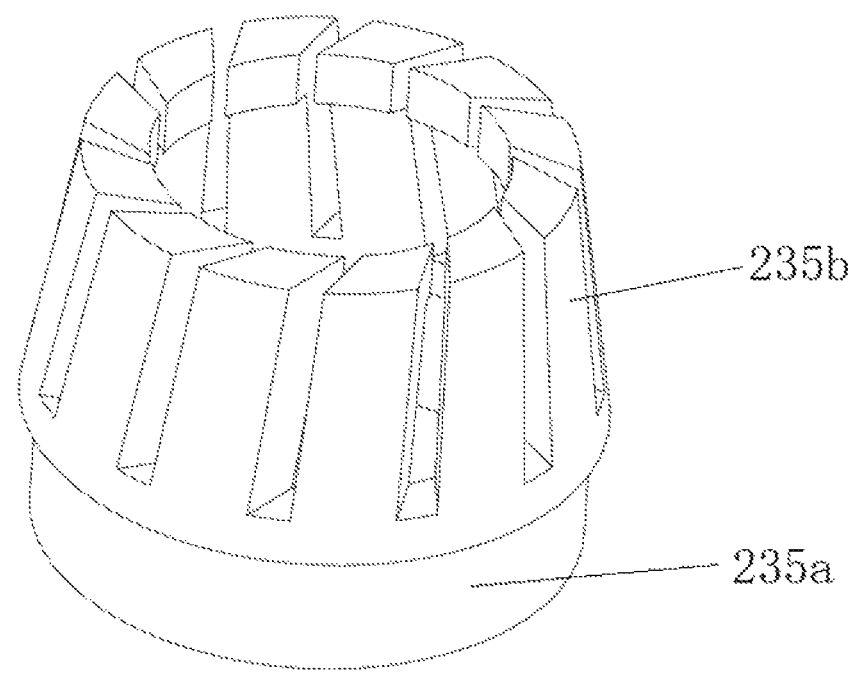
FIG. 20 is a space structure diagram of a lock catch in FIG. 15.

Application 4:

As shown in FIG. 13 and FIG. 14, it is a type of LED module including a lens set, LED particles, a circuit board and a heat sink. The LED particles are welded on the circuit board which is tightly fit with the heat sink and the lens set is set over the heat sink above the LED particle. Packaging colloids are filled into the confined space formed by the lens set and heat sink.

In the Embodiment, the refractive index of packaging colloids is 1.3~1.7, similar to the one of the lens of the lens set. In the LED module of the present invention, packaging colloids replaces the original air dielectric in the transmission of light sent out from the LED chip. Moreover, the matching of the refractive index of the packaging colloids and the lens of the lens set improves light out-coupling efficiency to the greatest extent. Lighting efficiency is improved by 10~15% compared to the existing technologies.

For the above LED module, sealing processes are as below:

(1) corresponding infusion and discharge holes are set respectively on the heat sink and the circuit board;

(2) weld the LED particle on the circuit board, and then closely fit the circuit board to the heat sink. Cover the lens set on the heat sink, wherein the lens set is above the LED particles, wherein the LED particle includes a LED chip and a dissipation base with the former setting on the latter. Fluorescent powders are coated on the LED chip and electrode bonding pad is set on the dissipation base.

(3) Fill packaging colloids through the infusion hole at the bottom of the heat sink into the gap between the heat sink and lens set. The remaining air will be discharged through the discharge hole. The refractive index of packaging colloids is 1.3~1.7.

(4) seal the infusion hole and discharge hole by tightening a screw or sealing with glue.

In the LED module of the present invention, the gap formed between the lens set and the heat sink is filled with packaging colloids. The circuit board and each LED particle are covered by the packaging colloids, rendering good waterproofing performance. In the LED module of the present invention, heat generated from the LED particle not only can be transmitted to the circuit board through the bottom of the radiation holder, but also could transmitted to the circumstance through the packaging colloids, rendering higher radiation efficiency.

The details disclosed above are only some embodiments of the application. However, the application should not be limited to the above description. Any alteration the technicians of the art may come up with should be within the scope of protection of the application.

The invention claimed is:

1. A wire-through hole sealing device applied to an LED module to seal a wire-through hole through which an electric wire is passed, wherein the wire-through hole includes a narrow caliber part upside and a wide caliber part downside; a first transitional platform is set at a parting of the narrow caliber part and the wide caliber part; a first threads are set on an internal side of the wide caliber part downside of the wire-through hole, wherein the wire-through hole sealing device includes:

a hollow "T"-shaped sealing ring which includes a narrow part and a wide corona part, and a second transitional platform is set between the narrow part and the wide corona part, the "T"-shaped sealing ring is set on the electric wire;

an external-threaded nut which is hollow, and a second threads are set on an external side of the external-threaded nut, wherein the second threads match with the first threads;

the "T"-shaped sealing ring is set around the electric wire, and the external-threaded nut is set around the narrower part of the "T"-shaped sealing ring; the electric wire that set with the "T"-shaped sealing ring and the external-threaded nut goes through the wide caliber part and the narrow caliber part of the wire-through hole in sequence; the external-threaded nut is set into the wide caliber part of the wire-through hole by the first and the second threads; the "T"-shaped sealing ring is intro-pressed tightly by the external-threaded nut and the electric wire is pressed tightly by the "T"-shaped sealing ring; in addition, one end face of the external-threaded nut is pressed tightly to the second transitional platform of the "T"-shaped sealing ring, and in the mean time, the top of the wide corona part of the "T"-shaped sealing ring is pressed tightly to the first transitional platform;

a gap between the electric wire and the wire-through hole is filled with a sealing glue layer.

2. A wire-through hole sealing device applied to an LED module, wherein the wire-through hole comprises a narrow caliber part and a wide caliber part; a first transitional platform is disposed at a parting of the narrow caliber part and the wide caliber part; a first thread is provided on an internal side of the wide caliber part, wherein the first transitional platform has an inclination angle relative to side faces of the narrow caliber part and the wide caliber part; the wire-through hole sealing device comprises:

a hollow "T"-shaped sealing ring which comprises a wider corona part and a narrower part, and a second transitional platform set between the narrower part and the corona part;

a waterproof threaded pipe which is of a hollow structure with a main body part and a head, wherein the main body part is provided with a first threaded section and the head is provided with a second threaded section; and a counter bored hole is provided in the head downwards from an upper end face thereof;

a lock catch which is of a hollow structure with a lower end placeable in the counter bored hole of the waterproof threaded pipe and a lock catch claw teeth at the upper end face; and a waterproof threaded pipe cap which is of a hollow structure and inside which a third threaded section matching the second threaded section of the waterproof threaded pipe is disposed;

wherein the "T"-shaped sealing ring is sheathed on an electric wire, and the electric wire runs through the wire-through hole of a heat sink; an upper surface of the wider corona part of the "T"-shaped sealing ring is attached on the first transitional platform of the wire-through hole; the waterproof threaded pipe is sheathed on the narrow part of the "T"-shaped sealing ring, and the first threaded section of the waterproof threaded pipe is engaged and screwed up with the first thread of the wire-through hole to thereby press the "T"-shaped sealing ring such that sealing between the wire-through hole and the "T"-shaped sealing ring and sealing between the "T"-shaped sealing ring and the electric wire are achieved simultaneously; the lower end of the lock catch is placed in the counter bored hole of the waterproof threaded pipe; the waterproof threaded pipe cap covers above the lock catch and causes the third threaded section within the waterproof threaded pipe cap to be engaged and screwed up with the second threaded section of the head of the waterproof threaded pipe, thereby causing the waterproof threaded pipe cap to press the lock catch claw teeth under a thread engagement action with the waterproof threaded pipe; thus, the lock catch claw teeth are caused to press one end of the narrower part of the "T"-shaped sealing ring, and then the narrower part of the "T"-shaped sealing ring presses the electric wire, thereby locking the electric wire.

\* \* \* \* \*